(12) United States Patent
Amirpour et al.

(10) Patent No.: US 9,841,358 B2
(45) Date of Patent: Dec. 12, 2017

(54) METHOD AND SYSTEM FOR AUTOMATICALLY ESTABLISHING A COMMUNICATION CONNECTION TO A VEHICLE

(75) Inventors: Ramon Amirpour, Ebersbach (DE); Guenter Nobis, Nuertingen (DE); Roger Malmsheimer, Allmersbach Im Tal (DE)

(73) Assignee: ROBERT BOSCH GMBH, Stuttgart (DE)

(*) Notice: Subject to any disclaimer, the term of this patent is extended or adjusted under 35 U.S.C. 154(b) by 148 days.

(21) Appl. No.: 14/126,529

(22) PCT Filed: May 23, 2012

(86) PCT No.: PCT/EP2012/059580
§ 371 (c)(1),
(2), (4) Date: Mar. 26, 2014

(87) PCT Pub. No.: WO2012/171765
PCT Pub. Date: Dec. 20, 2012

(65) Prior Publication Data
US 2014/0236416 A1 Aug. 21, 2014

(30) Foreign Application Priority Data
Jun. 16, 2011 (DE) .................. 10 2011 077 599

(51) Int. Cl.
*G01M 17/007* (2006.01)
*G07C 5/00* (2006.01)
(52) U.S. Cl.
CPC .......... *G01M 17/007* (2013.01); *G07C 5/008* (2013.01); *G07C 2205/02* (2013.01)
(58) Field of Classification Search
USPC .............. 701/31.5, 31.4, 29.6, 33.2, 29.1; 365/185.18, 185.22, 189.011
See application file for complete search history.

(56) References Cited

U.S. PATENT DOCUMENTS 5,884,202 A * 3/1999 Arjomand .............. 701/31.4
6,094,609 A * 7/2000 Arjomand .............. 701/31.5
(Continued)

FOREIGN PATENT DOCUMENTS

CN 102016856 A 4/2011
DE 10 2008 006356 7/2009
(Continued)

OTHER PUBLICATIONS

Absolute kinematic GPS positioning for remote area; Kwon, J.H.; Jeong Woo Kim; Dong-Cheon Lee; Geoscience and Remote Sensing Symposium, 2001. IGARSS '01. IEEE 2001 International; vol. 5; DOI: 10.1109/IGARSS.2001.977905 Publication Year: 2001, pp. 2067-2069 vol. 5.*
(Continued)

*Primary Examiner* — Cuong H Nguyen
(74) *Attorney, Agent, or Firm* — Norton Rose Fulbright US LLP; Gerard Messina

(57) ABSTRACT

A method for automatically establishing a communication connection to a vehicle at a repair shop work station, including the tasks of connecting a plurality of mobile communication interfaces to one of a plurality of vehicles, establishing biunique assignments of the vehicles to the particular mobile communication interfaces connected to the vehicles, one of the tasks of automatically detecting identification data of one of the plurality of mobile communication interfaces and/or of the particular assigned vehicle, which are located at the repair shop work station, or automatically detecting position coordinates of the plurality of mobile communication interfaces; transmitting the identification data or position coordinates to a vehicle testing device at the repair shop work station, and automatically establishing a communication connection between the vehicle testing device and the mobile communication interface located at (Continued)

the repair shop work station based on the detected identification data or the detected position coordinates.

11 Claims, 7 Drawing Sheets

(56) References Cited

U.S. PATENT DOCUMENTS

| | | | |
|---|---|---|---|
| 6,847,965 | B2 | 1/2005 | Walker et al. |
| 8,280,581 | B2* | 10/2012 | Keane .............................. 701/36 |
| 8,299,959 | B2* | 10/2012 | Vossiek et al. ............... 342/157 |
| 9,070,234 | B2* | 6/2015 | Schneider .............. G06Q 10/10 |
| 2002/0105968 | A1* | 8/2002 | Pruzan ................ H04L 12/4604 370/465 |
| 2008/0275819 | A1 | 11/2008 | Rifai |
| 2009/0281687 | A1* | 11/2009 | Keane .............................. 701/29 |
| 2009/0299539 | A1* | 12/2009 | Chinnadurai et al. ........ 700/293 |
| 2009/0323414 | A1* | 12/2009 | Fibranz et al. .......... 365/185.03 |
| 2010/0042288 | A1* | 2/2010 | Lipscomb et al. .............. 701/33 |
| 2010/0082569 | A1 | 4/2010 | Cresto et al. |
| 2010/0324864 | A1* | 12/2010 | Vossiek et al. ............... 702/151 |
| 2012/0209470 | A1* | 8/2012 | Gilbert et al. ................ 701/31.4 |
| 2014/0188328 | A1* | 7/2014 | Schneider .............. G07C 5/008 701/29.6 |

FOREIGN PATENT DOCUMENTS

| | | | | |
|---|---|---|---|---|
| DE | WO 2012163586 | A1 * | 12/2012 | ............. G06Q 10/10 |
| EP | 0754940 | A2 | 1/1997 | |

OTHER PUBLICATIONS

Velocity Analysis for UHF RFID Vehicle License Plate; Ling-fei Mo; Chun-fang Qin; Xiao-fen Tang; Optoelectronics and Image Processing (ICOIP), 2010 International Conference on; Year: 2010, vol. 2; pp. 722-725, DOI: 10.1109/ICOIP.2010.242.*

Secure Design of RFID Tags in the New Type License Plates Automatic Identification System; Zhiguo Zhou; Wenyin Li; Chunyan Deng; Tong Li; Yanwen Li; Computer Science and Computational Technology, 2008. ISCSCT '08. International Symposium on Year: 2008, vol. 1; pp. 694-697, DOI: 10.1109/ISCSCT.2008.19.*

Design of New Type License Plates Based on RFID and its Secure Automatic Identification System; Zhiguo Zhou; Wenyin Li; Tong Li; Chunyan Deng; Xiaodong Fu; Networked Computing and Advanced Information Management, 2008. NCM '08. Fourth International Conference on; Year: 2008, vol. 1; pp. 298-302, DOI: 10.1109/NCM.2008.53.*

The development of UHF RFID metal tag applying to license plate; Gi-Hyun Hwang; Kyoung-Hwan Cha; Do-Un Jeong; Dae-Seok Lee; Computer Engineering and Technology (ICCET), 2010 2nd International Conference on; Year: 2010, vol. 3 pp. V3-271-V3-274, DOI: 10.1109/ICCET.2010.5485866.*

Broker architecture for collaborative UAVs cloud computing; Sara Mahmoud; Nader Mohamed; 2015 International Conference on Collaboration Technologies and Systems (CTS); Year: 2015; pp. 212-219, DOI: 10.1109/CTS.2015.7210423.*

An implementation of multichannel multi-interface MANET for fire engines and experiments with WINDS satellite mobile earth station; Yasunori Owada et al.; 2016 IEEE Wireless Communications and Networking Conference; Year: 2016 pp. 1-6, DOI: 10.1109/WCNC.2016.7565075.*

An overview of interface management; P. Harrison; B. A. Hamilton; ASME/IEEE Joint Rail Conference, 2004. Proceedings of the 2004; Year: 2004; pp. 89-99, DOI: 10.1115/RTD2004-66017.*

* cited by examiner

METHOD AND SYSTEM FOR AUTOMATICALLY ESTABLISHING A COMMUNICATION CONNECTION TO A VEHICLE

FIELD OF THE INVENTION

The present invention relates to a method and to a system for automatically establishing a communication connection to a vehicle, in particular to a vehicle having a connected mobile communication interface at work stations of a repair shop.

BACKGROUND INFORMATION

The publication DE 10 2008 006 356 A1 discusses a method for locating the parking position of a vehicle to which an RFID tag is assigned by evaluating radio signals of the RFID tag.

The publication U.S. Pat. No. 6,847,965 B2 discusses a video system for detecting the license plates of vehicles and for comparing detected license plates to a database of stored vehicle data.

The technical development of motor vehicle testing technology has resulted in a plurality of specific external testing devices for different testing areas and motor vehicle components. The vehicle testing devices used for this purpose are highly specialized and adapted to the corresponding vehicle components. Vehicle testing devices are frequently used at special work stations of a repair shop or of an inspection center, for example because the vehicle testing devices are fixedly installed in the repair shop. A vehicle located in the repair shop for fault diagnosis and/or repair is moved from work station to work station, as a function of the test or repair to be carried out.

In today's motor vehicles, many functions are carried out by electronic control units which are connected to the vehicle electronics. The electronic control units frequently also take over onboard diagnostic functions of the vehicle systems and store special diagnostic and/or operating state data. To be able to evaluate the data of the diagnostic functions from the control units, universal diagnostic testers have been developed, which make it possible to communicate with the control units located in the vehicle. The functionality of the communication may be very different and, for example, relates to reading out stored error codes, transmitting actual values, carrying out complex actuator tests, resetting the service intervals, breaking-in installed replacement parts, and similar tasks.

Diagnostic testers usually include an assembly which is responsible for the communication with the vehicle. This assembly is generally referred to as a vehicle communication interface, a term which is customary internationally, abbreviated as VCI. Such VCIs may also be situated in a dedicated housing and may communicate by wire or wirelessly with universal operating and display devices, such as laptops, PDAs or smart phones. The diagnostic functionality of universal diagnostic testers or operating and display devices is assured via corresponding diagnostic software, which allows operation, display, control of the diagnostic process, and communication with the electronic control units via the VCI.

VCIs may be configured as mobile communication interfaces, which may be assigned to a specific vehicle for the duration of a stay in the repair shop. For this purpose, one of a plurality of mobile communication interfaces available in a repair shop may be connected to the vehicle at the vehicle service reception area in the repair shop, and corresponding identification data on the vehicle may be saved to the mobile communication interface. For example, the vehicle type, vehicle license number, serial number, customer data, order number and similar vehicle-specific data may be stored in the mobile communication interface.

Such mobile communication interfaces are thus carried along with the vehicle from work station to work station and may then be used within the repair shop at the different work stations by the particular vehicle testing devices to communicate with the control units installed in the vehicle. The necessity of a complex re-identification of the vehicle at each work station is thus dispensed with since the previously ascertained identification data may be read out from the mobile communication interface into the vehicle testing device.

However, to initiate the communication between the particular vehicle testing device and a mobile communication interface, it is necessary to clearly identify the particular mobile communication interface. Previously, an operator of a vehicle testing device was required to select the vehicle sitting in front of him, or the associated repair shop order number, to initialize the communication. In particular with wireless communication between the vehicle testing devices and the mobile communication interfaces, it may happen that multiple mobile communication interfaces, which are assigned to different vehicles in the repair shop, are within range of the vehicle testing device. In this case, the operator or repair shop employee must select the vehicle which corresponds to the correct vehicle from a list of available vehicles. The mobile communication interfaces may initiate the corresponding list entry themselves when in range, or a central repair shop server handles the management of all mobile communication interfaces in the repair shop and updates the relevant vehicle list.

In any case, the repair shop employee himself must identify the vehicle sitting in front of him at his work station to make a correct manual selection from the list of all available mobile communication interfaces. Such a manual selection is always associated with the possibility of human error. Should the employee be mistaken when selecting the mobile communication interface, communication would be initiated between the vehicle testing device and another vehicle which is not located at the work station. Until the error is detected, for example incorrect diagnostic results could be generated, not intended vehicle functions could be triggered at a different work station with significant safety risks, and moreover this may result in confusion and lost working time.

A need therefore exists for approaches to avoid errors in the assignment of vehicles with mobile communication interfaces to vehicle testing devices during a repair shop cycle.

SUMMARY OF THE INVENTION

The present invention is based on the idea of automatically localizing vehicles within a repair shop cycle based on biunique parameters and assigning them to individual work stations in the repair shop to enable error-free communication to be set up between the testing, diagnostic, repair and/or maintenance devices located at the work station and a mobile communication interface (VCI) which is temporarily assigned to the vehicle. The identification of a vehicle may take place via an automatic comparison of work place-specific location information to vehicle identification data which are stored in the mobile communication interface or assigned to the vehicle to be identified itself. The principle according to the present invention is based on a detection of a vehicle identification when the position information is known, or a detection of position information when the vehicle identification is known. In any case, a unique assignment of the vehicle located at a repair shop work station to the particular assigned mobile communication interface may be made automatically. A communication connection to the correct vehicle may be automatically set up at any time with the detected information. On the one hand, this avoids operating errors by repair shop employees. On the other hand, the repair shop cycle may be expedited since the manual work steps for initiating the communication between the vehicle testing device and the mobile communication interface or electronic vehicle control units by the automatic identification mechanism are dispensed with.

The method according to the present invention for automatically establishing a communication connection to a vehicle at a repair shop work station as described herein includes the steps of connecting a plurality of mobile communication interfaces to one of a plurality of vehicles, establishing biunique assignments of the vehicles to the particular mobile communication interfaces connected to them, automatically detecting identification data of one of the plurality of mobile communication interfaces and/or of the particular assigned vehicle, which are located at the repair shop work station, or automatically detecting position coordinates of the plurality of mobile communication interfaces, transmitting the identification data or position coordinates to a vehicle testing device at the repair shop work station, and automatically establishing a communication connection between the vehicle testing device and the mobile communication interface located at the repair shop work station based on the detected identification data or the detected position coordinates.

According to one specific embodiment, at least one optically detectable vehicle license number of the vehicle located at the repair shop work station is detected with the aid of a video system installed at each repair shop work station. The mobile communication interface assigned to the vehicle may advantageously be inferred from the biunique assignment of the vehicle ascertained via the vehicle license number.

According to one further specific embodiment, identification data of an RFID tag situated in the mobile communication interface may be detected with the aid of an RFID reading device. As a result, an assignment of vehicles and mobile communication interfaces may advantageously be dispensed with since each of the mobile communication interfaces is already biuniquely classifiable via its RFID number.

According to one further specific embodiment, satellite navigation data of the plurality of mobile communication interfaces may be detected with the aid of satellite navigation receivers situated in each case in the mobile communication interfaces. This has the advantage that no dedicated infrastructure of detection devices must be provided in the repair shop, but only the mobile communication points must be equipped with satellite navigation receivers.

According to one alternative specific embodiment, the position coordinates may also be ascertained via a detection, using radio technology, of the plurality of mobile communication interfaces with the aid of radio transmitters situated in each case in the mobile communication interfaces.

The present invention further creates a system for automatically establishing a communication connection to a vehicle at a repair shop work station as recited in Claim 7, having a plurality of mobile communication interfaces, which are configured to be connected in each case to one of a plurality of vehicles in the repair shop, a central software component, which is configured to store biunique assignments of the vehicles to the particular mobile communication interfaces connected to the vehicles, and a detection device, which is configured to automatically detect identification data of one of the plurality of mobile communication interfaces and/or of the particular assigned vehicle, which are located at the repair shop work station, or which is configured to automatically detect position coordinates of the plurality of mobile communication interfaces. The detection device is further configured to transmit the identification data or position coordinates to a vehicle testing device at the repair shop work station to automatically establish a communication connection between the vehicle testing device and the mobile communication interface located at the repair shop work station based on the detected identification data or the detected position coordinates.

Refinements are the subject matter of the further particular descriptions herein.

The above-mentioned embodiments and refinements may be arbitrarily combined with each other, if useful. Further possible embodiments, refinements and implementations of the present invention also include not explicitly described combinations of features of the present invention which are described at the outset or hereafter with respect to the exemplary embodiments.

Further features and advantages of specific embodiments of the present invention are derived from the following description with respect to the accompanying drawings.

DETAILED DESCRIPTION

Figure 1:
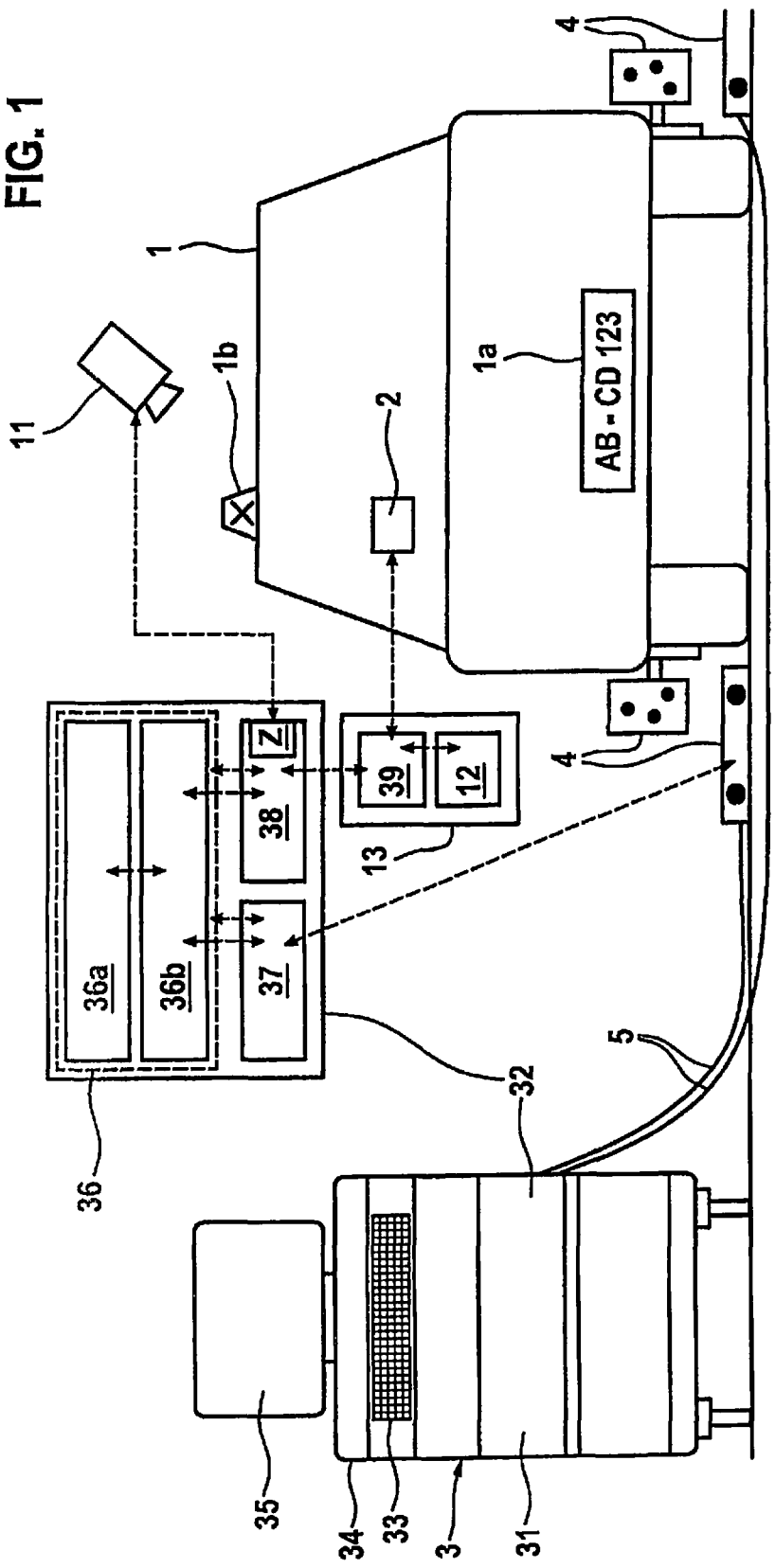
FIG. 1 shows a schematic illustration of a system for identifying a vehicle having a VCI at a repair shop work station according to one specific embodiment of the present invention.

In the figures of the drawings, identical and functionally equivalent elements, features and components are denoted by the same reference numerals, unless indicated otherwise. It goes without saying that components and elements in the drawings are not necessarily reproduced true to scale in relation to each other for the sake of clarity and comprehensibility.

Vehicle testing devices within the meaning of the present application are not limited to special vehicle testing devices. They may include, for example, wheel alignment testing devices, engine testers, emissions testing devices, brake testing devices, shock absorber testing devices, toe testing devices, weighing devices, brake fluid testing devices, sound level meters, diesel smoke testers, chassis measuring devices, toe angle testing devices, steering angle testers, air conditioner testing devices, and the like. These vehicle testing devices may be used in repair shops, in particular motor vehicle repair shops, inspection centers or comparable facilities. The methods and devices according to the present invention are in particular usable equally in these facilities.

Communication interfaces for vehicles are described hereafter, which within the meaning of the present application are referred to as "vehicle communication interfaces," VCI in short. These communication interfaces are in particular mobile interfaces, which are carried along with the vehicle from work station to work station in a repair shop.

FIG. 1 shows a schematic illustration of a system for identifying a vehicle 1 having a VCI 2 at a repair shop work station according to one specific embodiment.

A vehicle 1, in particular a motor vehicle, which may include one or multiple electronic control units, is located at a work station of a repair shop or inspection center. The electronic control unit or units may include specific control units for specific vehicle components or universal electronic control units of vehicle 1. The electronic control units may keep diagnostic data, error data, actual values, operating state data or similar vehicle-relevant data for specific vehicle components available via a standardized vehicle interface, which is not shown, and may be switched into certain operational states or processes.

The electronic control unit is, or the electronic control units are, connected to a VCI 2 via a standardized vehicle interface, which is not shown. VCI 2 may be connected to vehicle 1 at the beginning of a repair shop cycle for this purpose, for example in the vehicle service reception area. VCI 2 may be configured to store characteristics of vehicle 1, for example the vehicle owner, official license number, vehicle brand, vehicle make, vehicle identification number or similar identification data. The characteristics may be newly entered in the vehicle service reception area of the repair shop with the aid of a universal operating and display device or may be taken over from a central repair shop database from a previous visit to the repair shop.

VCI 2 may be one of a plurality of VCIs available in the repair shop which are provided for a plurality of vehicles located in the repair shop at the same time. For example, one of the VCIs is biuniquely assigned to each of the vehicles in the vehicle service reception area for this purpose. Upon reception of vehicle 1 in the repair shop, for example, one of the VCIs which is presently not assigned is selected and connected to vehicle 1. By storing the characteristics of vehicle 1, VCI 2 is then "personalized" so-to-speak, i.e., VCI 2 is biuniquely assigned to vehicle 1. This assignment may be temporary, i.e., the assignment applies for the duration of the stay of vehicle 1 at the repair shop, until VCI 2 is disconnected from vehicle 1 again after the repair shop order has been completed. The respective VCI 2 may then be assigned again to another vehicle for a repair shop cycle. The particular effective biunique assignment of each of the plurality of VCIs may be stored in a central database, as is described in greater detail below.

VCI 2 is configured to be carried along with vehicle 1 in the repair shop when vehicle 1 is moved to different work stations of the repair shop for maintenance, diagnostic, repair and/or testing purposes. A specific vehicle testing device 3 of such a repair shop work station is shown in FIG. 1 by way of example. Vehicle testing device 3 in FIG. 1 is a wheel alignment device 3, for example, which may be set up at a work station for wheel alignment and may be fixedly installed. However, it is clear that any other vehicle testing device may also be used instead of the wheel alignment device 3, and that comparable systems and devices for identifying a vehicle having a VCI may be used at other work stations of the repair shop.

The wheel alignment device 3 includes a test module 4, a control processor 31 having control software 32, an operating device 33, and a display device 35. Control processor 31, operating device 33, and display device 35 may be situated in a housing 34. Wheel alignment device 3 may be connected to vehicle 1 or to components of vehicle 1, such as the exhaust, the engine, the air conditioner, the braking system or the like, via cables, sensors, hoses and similar suitable connecting arrangement 5. In the exemplary specific embodiment of FIG. 1, connecting arrangement of wheel alignment device 3 are connected to test module 4, which is able to carry out the actual axle alignment. Vehicle testing device 3 may be accommodated in a cart, for example, or fixedly connected to the repair shop floor at the work station.

Test module 4 may have a specific vehicle test module in general, which is able to carry out predefined tests or diagnoses with respect to certain components of vehicle 1, for example engine tests, chassis measurement, air conditioner maintenance or the like. Control processor 31 may be configured to control the corresponding specific functions of test module 4 with the aid of control software 32.

Control software 32 is shown in greater detail in the remote box in FIG. 1. Control software 32 includes a software layer 36a for operating vehicle testing device 3 and for visualizing the test processes and results, a software layer 36b for controlling the test processes, a first communication layer 37 which establishes a communication between the test process control by software layer 36b and test module 4, and a second communication layer 38 which establishes communication between the test process control by software layer 36b and a diagnostic server device 39. Diagnostic server device 39 and its operating mode will be described in greater detail below.

Software layers 36a and 36b for operation, display and test process control may also be integrated into a shared software layer 36. Second communication layer 38 may include a software component for communicating with the user, a software component for establishing a communication with diagnostic server device 39, a software component for the communication of the test process control with diagnostic server device 39 during a test process and/or a testing device parameter set.

Communication layer 38 may receive previously stored identification data from VCI 2 of vehicle 1 at the beginning of a test process in upstream work steps of the repair shop cycle and forward these to software layer 36b for test process control. The test process may thus advantageously be automatically adapted to vehicle 1. Moreover, communication layer 38 may activate functions in electronic control units of vehicle 1 during the test cycle and may dynamically forward diagnostic data from the electronic control units of vehicle 1 to software layer 36b during the test cycle.

Communication layer 38 may further advantageously receive preconfigured parameters of the specific test module 4 to activate or deactivate certain functions of the electronic control units of vehicle 1 in a targeted manner. The usually large scope of functionality of the electronic control units may thus advantageously be broken down to the functions which are required for the particular test cycle so as to avoid errors by the user during the operation of vehicle testing device 3.

However, before a test process controlled by communication layer 38 is able to take place, the communication between communication layer 38 and vehicle 1 must be initialized. The communication is provided via a diagnostic server device 39, which in turn may communicate with communication layer 38 and VCI 2. In the example of FIG. 1, diagnostic server device 39 is situated on a central diagnostic server 13, which may be configured for central communication, for example wireless communication, in the repair shop with all VCIs presently in use in the repair shop. In addition to diagnostic server device 39, diagnostic server 13 includes a central software component 12 for this purpose, for example a database in which all VCIs, in particular also VCI 2, may be managed. For this purpose, central software component 12 may have a data pool in which the biunique assignment of each of the plurality of VCIs to the corresponding vehicles is stored, i.e., in which it is indicated which VCI is presently connected to which vehicle. The data pool may be updated in the vehicle service reception area of the repair shop in accordance with the connection of the VCI to the vehicles located in the repair shop. For example, an assignment of VCI 2 to vehicle 1 is stored in central software component 12.

It is not necessary that central software component 12 is provided in a diagnostic server 13; it may also be possible to equip only one of the vehicle testing devices in a repair shop, which may be a testing device in the vehicle service reception area, with central software component 12. It may further also be possible to provide a universal operating and display device, such as a laptop, a PDA or a smart phone, with central software component 12, instead of a vehicle testing device 3.

The system includes a detection device 11, for example a video camera, a webcam or a similar device, which may detect and evaluate at least one optically detectable vehicle feature, for example license plate 1a of vehicle 1, or a temporarily attached repair shop license number 1b of vehicle 1 presently located at the repair shop work station. Detection device 11 may gain unique vehicle identification data about vehicle 1, and thus biuniquely identify the same, from one or multiple of the detected vehicle features 1a and 1b, for example via a feature detection mechanism. Detection device 11 transmits the detected identification data to a software component Z of communication layer 38 of vehicle testing device 3, which is then able to ascertain the corresponding VCI 2 presently assigned to vehicle 1 based on the biunique assignments stored in central software component 12 of diagnostic server 13. The VCI 2 may be ascertained in this way, to which diagnostic server device 39 may then establish a communication connection.

Figure 5:
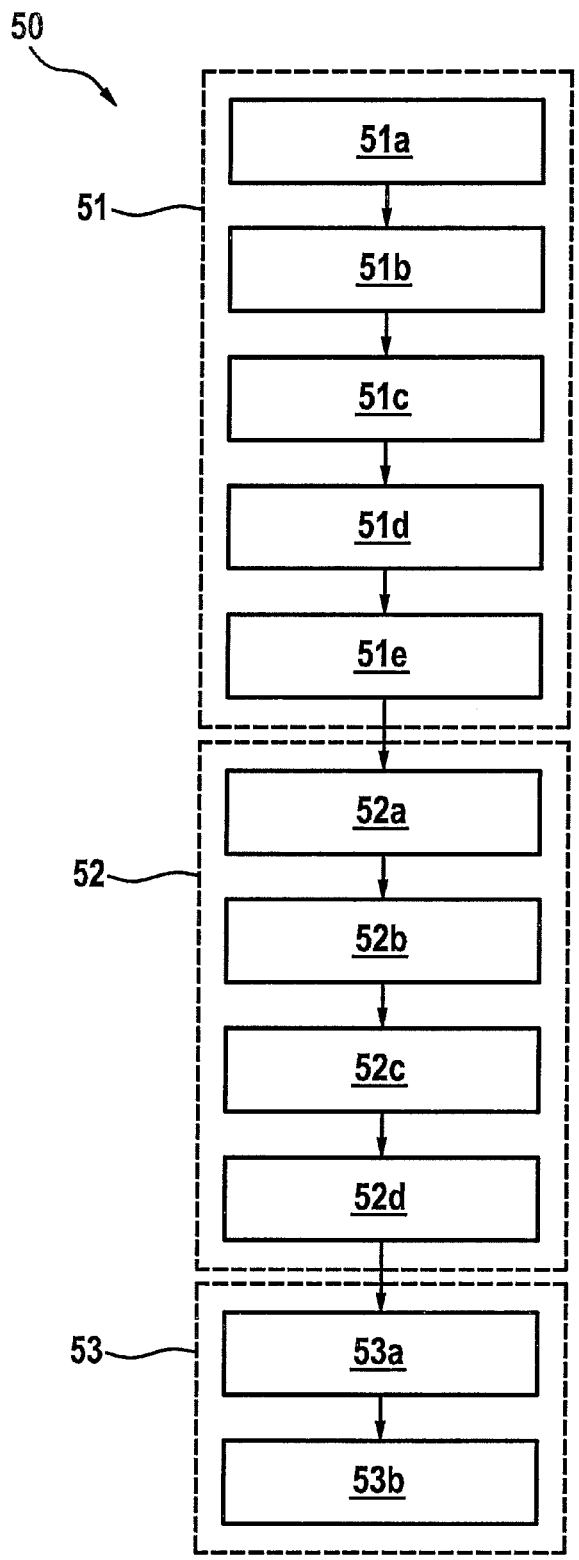
FIG. 5 shows a schematic illustration of a method for identifying a vehicle having a VCI at a repair shop work station according to one further specific embodiment of the present invention.

FIG. 5 shows the schematic process of a method 50 for automatically establishing a communication connection to vehicle 1 using the system shown in FIG. 1. The steps of the method which may be carried out at the beginning of the repair shop cycle, for example in the vehicle service reception area, are denoted by reference numeral 51, the steps which may be carried out uniformly at each of the different work stations in the repair shop are denoted by reference numeral 52, and the steps which may be carried out at each work station as needed are denoted by reference numeral 53.

In a first step 51a, a manual, biunique assignment of a VCI 2 to a vehicle 1 and its one or multiple optically detectable vehicle feature(s), which is/are storable and updatable for a plurality of VCIs in a central software component 12, is carried out (step 51b). VCI 2 is connected to vehicle 1 (step 51c) and remains in or on vehicle 1 for the duration of the stay in the repair shop. The detected characteristics of vehicle 1 may be stored in VCI 2 (step 51d), and a first identification of vehicle 1 for testing or diagnostic procedures may take place as part of a rapid diagnosis (step 51e).

When a vehicle drives to a repair shop work station (step 52a), initially at least one optically detectable vehicle feature 1a, 1b of vehicle 1 is detected and evaluated with the aid of detection device 11 (step 52b). Using the optical identification data of vehicle 1 thus ascertained, VCI 2 assigned to vehicle 1 is identified in central software component 12 (step 52c), so that a communication connection may automatically be set up between vehicle testing device 3 and VCI 2 (step 52d).

Thereafter, testing and diagnostic software 32 automatically may selectively access the characteristics and identification data for testing and diagnostic processes stored in VCI 2 (step 53a), so that communication may take place between testing and diagnostic software 32 and the control units in vehicle 1 as a function of the work steps to be carried out at the repair shop work station (step 53b).

Figure 2:
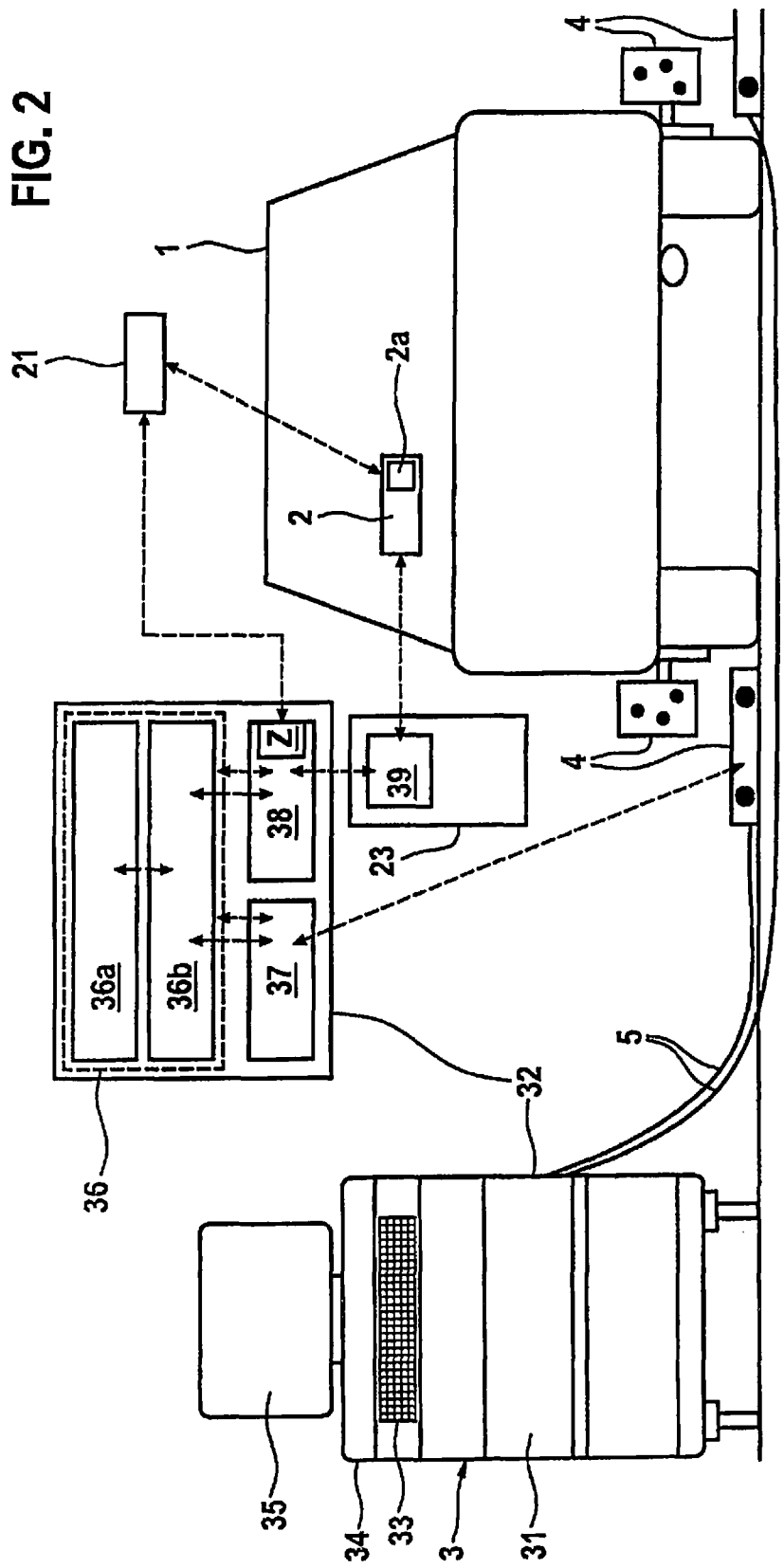
FIG. 2 shows a schematic illustration of a system for identifying a vehicle having a VCI at a repair shop work station according to one further specific embodiment of the present invention.

FIG. 2 shows a schematic illustration of a system for identifying a vehicle having a VCI at a work station in a repair shop according to one further specific embodiment. As in FIG. 1, a vehicle 1 is shown by way of example, which is located at a work station having a vehicle testing device 3. As in FIG. 1, vehicle 1 is connected to a VCI 2, via which a communication to vehicle 1 may be set up via diagnostic server device 39.

The set-up in FIG. 2 differs from the set-up in FIG. 1 in that VCI 2 has a wireless identification unit 2a, for example an RFID tag 2a. RFID tag 2a is provided with biunique information, which uniquely distinguishes RFID tag 2a from other RFID tags. For example, a serial number of VCI 2, such as a MAC (media access control) number, may be stored in RFID tag 2a. The known assignment of the information in the RFID tag to the plurality of VCIs in the repair shop is stored in software component Z in communication layer 38 of control software 32 of each of the vehicle testing devices, for example wheel alignment device 3. Diagnostic server device 39 in FIG. 2 may thus be situated in a central diagnostic server 23, which contrary to diagnostic server 13 in FIG. 1 need not have a further central software component because a temporally stable assignment of the RFID tag and VCI exists.

The system further includes a wireless detection device 21, for example an RFID reading device 21, which is able to read out RFID tag 2a of VCI 2 located at the particular repair shop work station. Identification data of RFID tag 2a may thus be read out and transmitted by detection device 21 to a software component Z of communication layer 38 of testing and diagnostic software 32, and the corresponding VCI 2 presently assigned to vehicle 1 may be ascertained with the aid of the biunique assignments stored therein of the identification data to the plurality of VCIs present in the repair shop so that, as in the system in FIG. 1, a communication connection may automatically be initiated between vehicle testing device 3 and VCI 2 and the control units present in vehicle 1.

Figure 3:
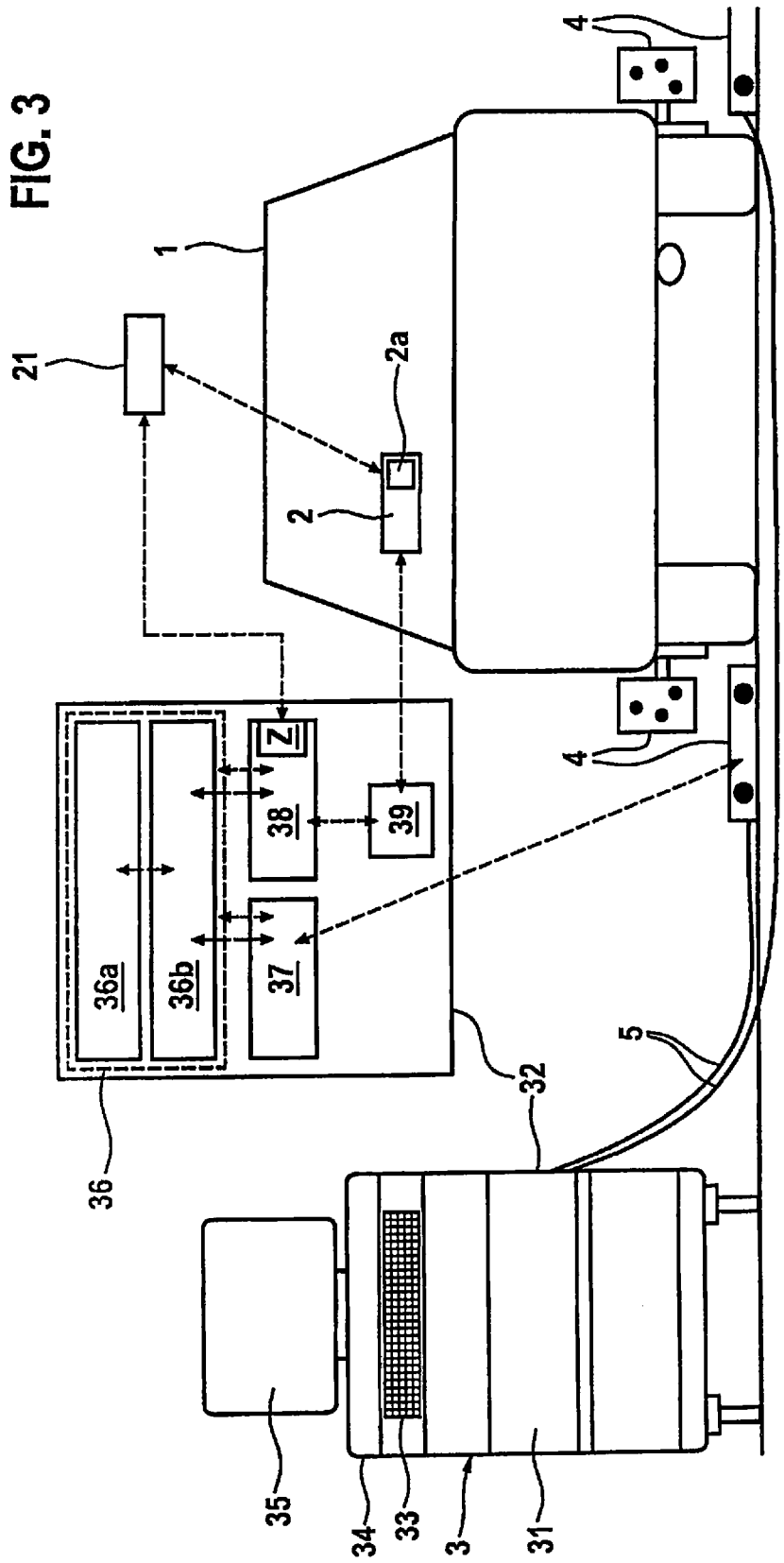
FIG. 3 shows a schematic illustration of a system for identifying a vehicle having a VCI at a repair shop work station according to one further specific embodiment of the present invention.

FIG. 3 shows a system for identifying a vehicle having a VCI at a work station in a repair shop, which is distinguished from the system of FIG. 2 only in that diagnostic server device 39 is not situated in a central diagnostic server 39, but is part of the particular testing and diagnostic software 32 of vehicle testing device 3. As a result, an identification of vehicle 1 may take place locally at each work station, and a central repair shop server or diagnostic server is not absolutely necessary.

Figure 6:
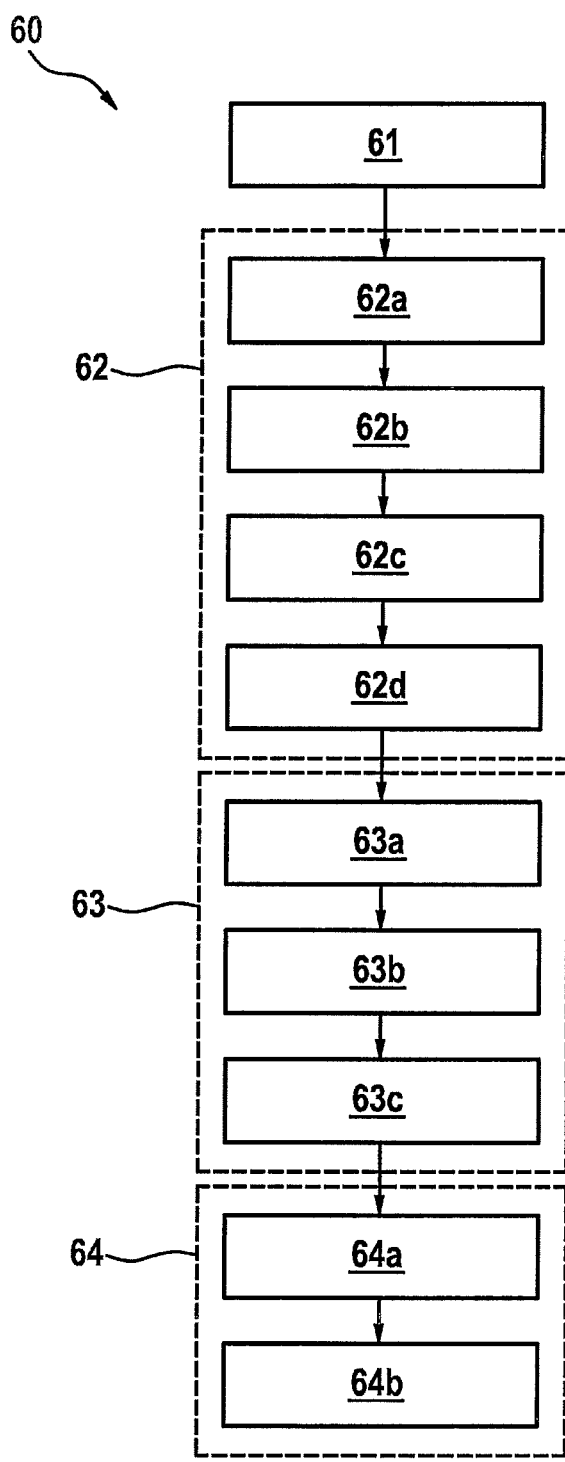
FIG. 6 shows a schematic illustration of a method for identifying a vehicle having a VCI at a repair shop work station according to one further specific embodiment of the present invention.

FIG. 6 shows the schematic process of a method 60 for automatically establishing a communication connection to vehicle 1 using the system shown in FIG. 2 or 3. The steps of the method which may be carried out at the beginning of the repair shop cycle, for example in the vehicle service reception area, are denoted by reference numeral 62, the steps which may be carried out uniformly at each of the different work stations in the repair shop are denoted by reference numeral 63, and the steps which may be carried out at each work station as needed are denoted by reference numeral 64.

In an initial step 61, which is independent of the repair shop cycle, a unique identification feature, for example a MAC number, is stored in each RFID tag 2a of the plurality of VCIs 2. The information about the assignment of the identification features to the plurality of VCIs in a repair shop is stored in software component Z of each of the vehicle testing devices and universal operating and display devices present in the repair shop.

Steps 62a through 62d correspond to steps 51a as well as 51c through 51e of the method shown in FIG. 5.

When a vehicle drives to a repair shop work station (step 63a), initially RFID tag 2a of VCI 2 of vehicle 1 is detected and evaluated with the aid of detection device 21 (step 63b). The identification data of vehicle 1 thus ascertained are transmitted to vehicle testing device 3, which is able to automatically establish a communication connection between vehicle testing device 3 and VCI 2 based on the detected identification data of VCI 2 and the information stored there about the assignment of the identification features to the plurality of VCI (step 63c).

Steps 64a and 64b then again correspond to steps 53a and 53b in FIG. 5.

Figure 4:
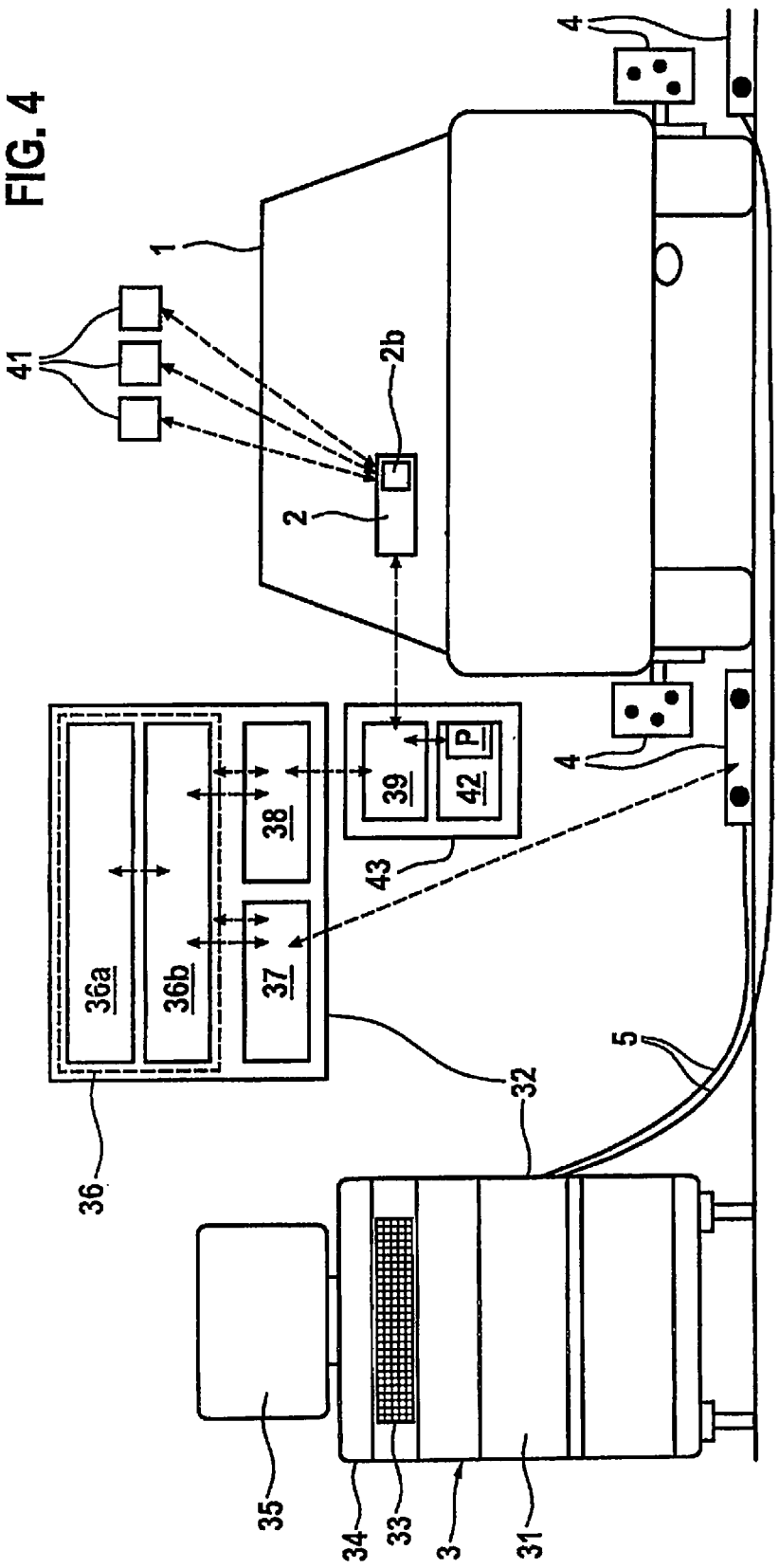
FIG. 4 shows a schematic illustration of a system for identifying a vehicle having a VCI at a repair shop work station according to one further specific embodiment of the present invention.

FIG. 4 shows a schematic illustration of a system for identifying a vehicle 1 having a VCI 2 at a repair shop work station according to one further specific embodiment.

The system in FIG. 4 differs from the system in FIG. 1 in that VCI 2 has a satellite navigation receiver 2b or a radio transmitter 2b. Satellite navigation receiver 2b may have a GPS or GALILEO receiver, for example, and radio transmitter 2b may include a WLAN device, a Bluetooth device or a similar device, for example. The system in FIG. 4 further includes satellites of a satellite navigation system, such as GPS or GALILEO, as detection device 41, or at least one positioning sensor, which may be situated inside the repair shop area, and which may detect and calculate the position of radio transmitter 2b in the repair shop, for example using propagation time and/or field strength measurement with the aid of triangulation or multilateration methods.

The position coordinates of satellite navigation receiver 2b or radio transmitter 2b detected with the aid of detection device 41 may be uniquely assigned to the particular VCI and transmitted to a central software component 42 of a diagnostic server 43. In the case of a satellite navigation receiver 2b, as is shown in FIG. 4, the position coordinates may be transmitted via VCI 2 itself since position coordinates are ascertained in satellite navigation receiver 2b itself.

In contrast, in the case of a radio transmitter 2b, the position coordinates may be determined in the positioning sensors and transmitted by the positioning sensors via a connection (not shown in FIG. 4), for example a wireless connection, to central software component 42. When using a radio transmitter 2b, it may also be possible to distinguish between different VCIs 2 in the positioning sensors using unique characteristic features. For example, different VCIs 2 may transmit at different radio frequencies, or identification codings may be transmitted to the positioning sensors. Central software component 42 and diagnostic server 43 are distinguished from the particular components of FIG. 1 only in that central software component 42 has a discriminator model P, which compares the position coordinates transmitted by detection device 41 to a stored image of the repair shop with the aid of mathematical methods to ascertain an assignment of the particular position coordinates to one of the work stations of the repair shop. It is thus possible at any time in central software component 42 to calculate at which work station which vehicle 1 or which VCI 2 is located. Once again, a communication connection may automatically be set up between vehicle testing device 3 and VCI 2, and thus vehicle 1, with the ascertained information.

Figure 7:
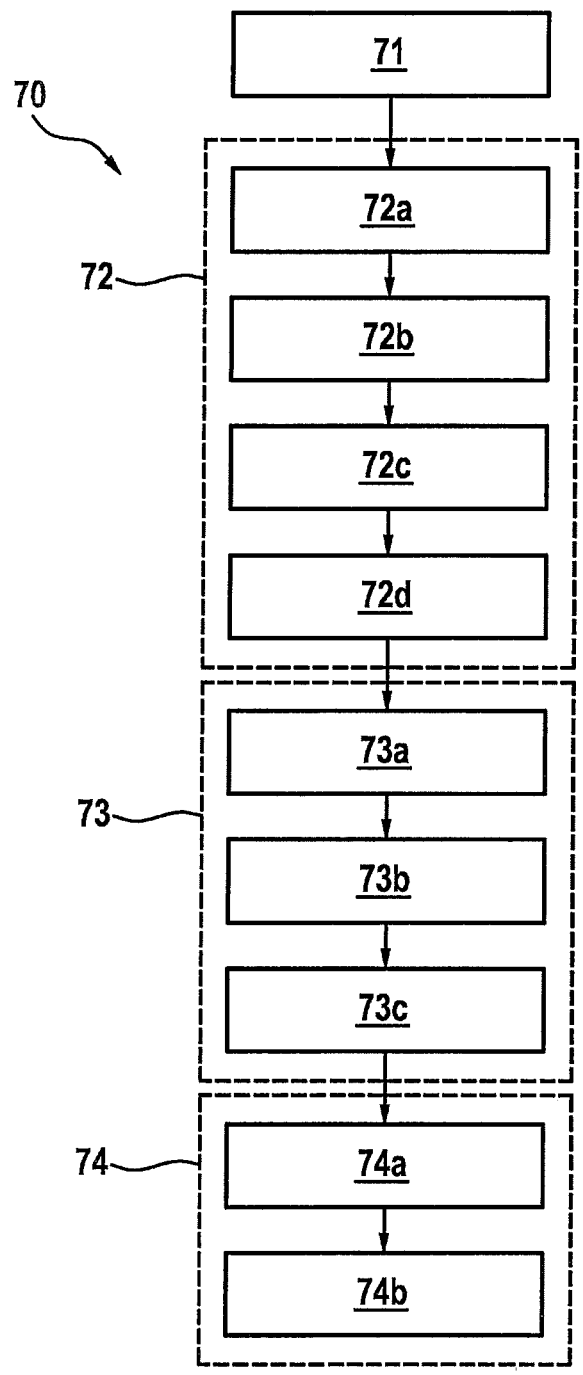
FIG. 7 shows a schematic illustration of a method for identifying a vehicle having a VCI at a repair shop work station according to one further specific embodiment of the present invention.

FIG. 7 shows the schematic process of a method 70 for automatically establishing a communication connection to vehicle 1 using the system shown in FIG. 4. The steps of the method which may be carried out at the beginning of the repair shop cycle, for example in the vehicle service reception area, are denoted by reference numeral 72, the steps which may be carried out uniformly at each of the different work stations in the repair shop are denoted by reference numeral 73, and the steps which may be carried out at each work station as needed are denoted by reference numeral 74.

In an initial step 71, which is independent of the repair shop cycle, a two- or three-dimensional image of the repair shop with the coordinates of each work station is detected with the aid of a suitable arrangement and stored in central software component 42 in such a way that this information may be used by discriminator model P, so that an assignment of a VCI or vehicle to a work station may take place.

Steps 72a through 72d correspond to steps 51a as well as 51c through 51e of the method shown in FIG. 5.

When a vehicle drives to a repair shop work station (step 73a), initially the position coordinates of transmitter 2b of VCI 2 of vehicle 1 are detected and evaluated with the aid of detection device 41 (step 73b). The position information thus ascertained is transmitted to vehicle testing device 3, which allows the corresponding VCI 2 based on a location coordinate comparison to position coordinates of the repair shop work station to automatically establish a communication connection between vehicle testing device 3 and VCI 2 (step 73c) as a result of the detected position information.

Steps 74a and 74b then again correspond to steps 53a and 53b in FIG. 5.

What is claimed is:

1. A method for automatically establishing a communication connection to a vehicle at a repair shop work station, the method comprising:
  connecting a plurality of mobile communication interfaces to one of a plurality of vehicles;
  establishing biunique assignments of the vehicles to the particular mobile communication interfaces connected to them;
  automatically detecting identification data of one of the plurality of mobile communication interfaces and/or of the particular assigned vehicle, which are located at the repair shop work station, or automatically detecting position coordinates of the plurality of mobile communication interfaces;

transmitting the identification data or position coordinates to a vehicle testing device at the repair shop work station; and automatically establishing a communication connection between the vehicle testing device and the mobile communication interface located at the repair shop work station based on the detected identification data or the detected position coordinates, wherein each biunique assignment permits the mobile communication interface to be identified by virtue of at least one detected characteristic of the vehicle assigned to the mobile communication interface.

2. The method of claim 1, wherein the detecting of the identification data includes a detection of one or multiple optically detectable vehicle features.

3. The method of claim 2, further comprising: ascertaining the mobile communication interface assigned to the vehicle located at the repair shop work station based on the detected vehicle feature and the biunique assignments.

4. The method of claim 1, wherein the detecting of the identification data includes a detection of identification data of an RFID tag situated in the mobile communication interface with the aid of an RFID reading device.

5. The method of claim 1, wherein the detecting of the position coordinates includes a detection of satellite navigation data of the plurality of mobile communication interfaces with the aid of satellite navigation receivers situated in each case in the mobile communication interfaces.

6. The method of claim 1, wherein the detecting of the position coordinates includes a detection, using radio technology, of location information of the plurality of mobile communication interfaces with the aid of radio transmitters situated in each case in the mobile communication interfaces.

7. A system for automatically establishing a communication connection to a vehicle at a repair shop work station, comprising:
a plurality of mobile communication interfaces, which are configured to be connected in each case to one of a plurality of vehicles in the repair shop;
a central software component, which is configured to store biunique assignments of the vehicles to the particular mobile communication interfaces connected to the vehicles; and
a detection device, which is configured to automatically detect identification data of one of the plurality of mobile communication interfaces and/or of the particular assigned vehicle, which are located at the repair shop work station, or which is configured to automatically detect position coordinates of the plurality of mobile communication interfaces; wherein the detection device is further configured to transmit the identification data or position coordinates to a vehicle testing device at the repair shop work station to automatically establish a communication connection between the vehicle testing device and the mobile communication interface located at the repair shop work station based on the detected identification data or the detected position coordinates, wherein each biunique assignment permits the mobile communication interface to be identified by virtue of at least one detected characteristic of the vehicle assigned to the mobile communication interface.

8. The system of claim 7, wherein the detection device is a video camera, which is configured to automatically detect data of vehicle license numbers.

9. The system of claim 7, wherein each of the plurality of mobile communication interfaces has a uniquely identified RFID tag, and wherein the detection device is an RFID reading device.

10. The system of claim 7, wherein each of the plurality of mobile communication interfaces has a uniquely identified radio transmitter, and wherein the detection device includes at least one positioning sensor, which is configured to determine a positioning of each of the plurality of mobile communication interfaces with the aid of the radio signals emitted by the particular radio transmitters.

11. The method of claim 1, wherein the detecting of the identification data includes a detection of one or multiple optically detectable vehicle features, including a vehicle license number of the vehicle located at the repair shop work station with the aid of a video system.

* * * * *